(12) United States Patent
Hayashi et al.

(10) Patent No.: US 9,313,468 B2
(45) Date of Patent: Apr. 12, 2016

(54) VIDEO DISPLAY DEVICE AND METHOD FOR ADJUSTING THE SAME

(71) Applicant: Panasonic Intellectual Property Management Co., Ltd., Osaka-shi, Osaka (JP)

(72) Inventors: Iori Hayashi, Osaka (JP); Teruto Tanaka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/656,254

(22) Filed: Mar. 12, 2015

(65) Prior Publication Data

US 2015/0264326 A1    Sep. 17, 2015

(30) Foreign Application Priority Data

Mar. 17, 2014  (JP) ................................. 2014-053054
Dec. 9, 2014   (JP) ................................. 2014-248505

(51) Int. Cl.
   *H04N 9/31*     (2006.01)
(52) U.S. Cl.
   CPC ........... *H04N 9/3111* (2013.01); *H04N 9/3197* (2013.01)
(58) Field of Classification Search
   CPC ..... H04N 9/3197; H04N 9/3111; H04N 9/31; H04N 9/3155; H04N 9/3114; G02B 26/008; G02B 27/1053; G02B 27/1033

USPC ......... 348/739, 742–744, 760, 759, 762–764, 348/767, 768, 770, 771
   IPC .................................................. H04N 9/31,5/74
   See application file for complete search history.

(56) References Cited

U.S. PATENT DOCUMENTS

| 7,621,641 B1 * | 11/2009 | Silverstein ........... G02B 26/008 348/750 |
| 2012/0050691 A1 * | 3/2012 | Tsuda ................... G03B 21/204 353/31 |

FOREIGN PATENT DOCUMENTS

| JP | 2012-003213 | 1/2012 |
| JP | 2013-225089 | 10/2013 |
| JP | 2014-006540 | 1/2014 |

* cited by examiner

*Primary Examiner* — Sherrie Hsia
(74) *Attorney, Agent, or Firm* — Hamre, Schumann, Mueller & Larson, P.C.

(57) ABSTRACT

A video display device includes a light source, a rotating substrate, a light detection unit, a light valve, and a control section. The light detection unit detects intensity of first color light emitted from the wheel in a second period included in a first period and in a third period which is included in the first period and does not overlap with the second period, where the first period is a period equal to time during which light continuously enters a first region. The control section controls at least one of the wheel and the light valve based on the intensity of the first color light detected in the light detection unit.

16 Claims, 10 Drawing Sheets

VIDEO DISPLAY DEVICE AND METHOD FOR ADJUSTING THE SAME

BACKGROUND OF THE INVENTION

1. Field of the Invention

The present disclosure relates to a field-sequential type video display device using a wheel and a method for adjusting the device.

2. Background Art

A method for synchronizing a wheel with a light valve (a spatial light modulation element) by detecting an index mark formed on the wheel in a video display device is known. An image display device of Japanese Patent Application Unexamined Publication No. 2013-225089 sets a sampling period so as to span two color regions (segments) of a color wheel, calculates a displacement amount of an index mark based on a light amount obtained in the sampling period, and then synchronizes rotation of the color wheel and driving of a light valve based on the displacement amount.

SUMMARY OF THE INVENTION

A video display device includes a light source, a rotating substrate, a light detection unit, a light valve, and a control section. The rotating substrate includes a wheel having a first region which allows receiving light from the light source and emitting the light as first color light. The light detection unit detects intensity of the first color light emitted from the wheel in a second period included in a first period and in a third period which is included in the first period and does not overlap with the second period, where the first period is a period equal to time during which the light continuously enters the first region. The light valve modulates the first color light emitted from the wheel and emits light for video. The control section is connected to the rotating substrate, the light detection unit, and the light valve, and controls at least one of the wheel and the light valve based on the intensity of the first color light detected in the light detection unit.

A method for adjusting a video display device includes applying light from a light source; allowing the light to enter a wheel having a first region in a rotating substrate, and then emitting the light as first color light; and applying the color light emitted from the wheel to a light valve. Furthermore, the method for adjusting a video display device includes detecting intensity of the first color light emitted from the wheel in a second period included in a first period and in a third period which is included in the first period and does not overlap with the second period, where the first period is a period equal to time during which the light continuously enters the first region; and controlling at least one of the wheel and the light valve based on the intensity of the detected first color light.

DETAILED DESCRIPTION OF THE PREFERRED EMBODIMENT

In a conventional image display device, when laser light enters two color regions so as to span the two regions, mixed color light may be emitted for a predetermined period. The feature appears remarkably when a phosphor wheel is used as the color wheel. Therefore, in a conventional method in which a sampling period is set so as to span two color regions of a color wheel, it may be difficult to synchronize rotation of the color wheel and driving of a light valve with each other with high accuracy.

The present disclosure provides a video display device capable of synchronizing rotation of a wheel and driving of a light valve with each other with high accuracy and a method for adjusting the video display device.

Hereinafter, an exemplary embodiment is described with reference to drawings. However, detailed description more than necessary may be omitted. For example, detailed descriptions of already well known matters or repeated descriptions for substantially the same configurations may be omitted in order to avoid the following description becoming unnecessarily redundant, so that a person skilled in the art can understand the description easily.

Note here that drawings in the attached sheet and the following description are provided in order that a person skilled in the art can sufficiently understand the present disclosure, but are not construed to limit the subject matter of the description of the claims.

Hereinafter, in the following exemplary embodiment, a projector is described as an example of a video display device. However, the exemplary embodiment is not limited to this example, the video display device may be a television display or other display devices.

EXEMPLARY EMBODIMENTS

Hereinafter, this exemplary embodiment is described with reference to drawings.

1-1. Configuration

[1-1-1. Overall Configuration]

Figure 1:
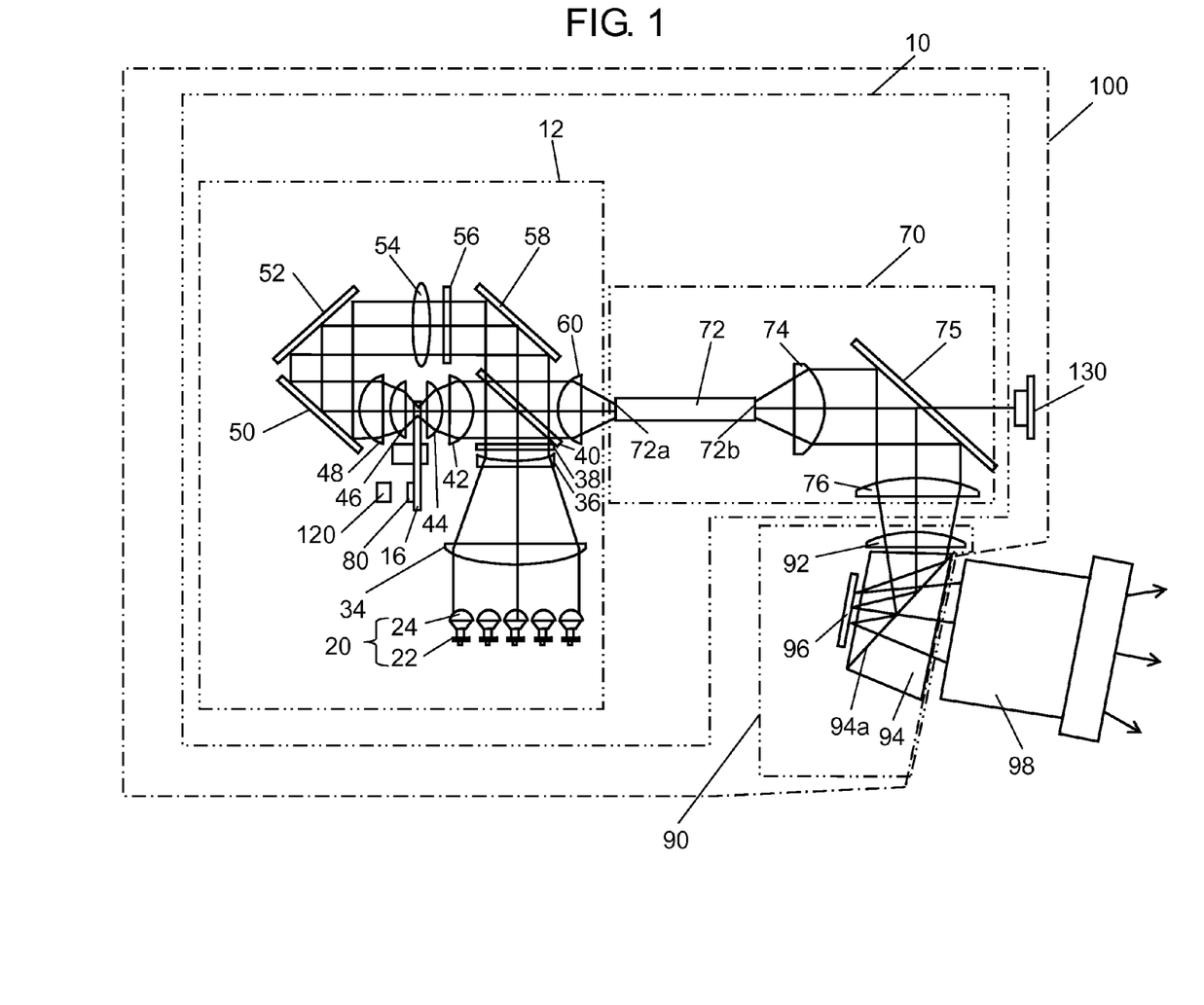
FIG. 1 is a configuration diagram of a video display device in accordance with an exemplary embodiment.

FIG. 1 is a configuration diagram of video display device 100 in accordance with this exemplary embodiment. In this exemplary embodiment, a projector is used as an example of video display device 100. Video display device 100 includes lighting unit 10, video generating unit 90, light detection unit (light sensor) 130, and control section 110 (see FIG. 4). Furthermore, video display device 100 may include projection lens 98. In FIG. 1, control section 110 is not shown.

Lighting unit 10 is configured to apply uniform and substantially parallel light to video generating unit 90. Details of lighting unit 10 are described later.

Video generating unit 90 includes lens 92, total reflection prism 94, and light valve 96. In this exemplary embodiment, a single DMD (Digital Mirror Device) is used as an example of light valve (spatial light modulation element) 96. Lens 92 forms an image of light from rod integrator 72 on light valve 96. Light entering total reflection prism 94 via lens 92 is reflected from face 94a and introduced into light valve 96. Light valve 96 is controlled by control section 110 (mentioned later) in response to video signal V1 input along with incident light. Video light (light for video) modulated by light valve 96 passes through total reflection prism 94 and is introduced into projection lens 98. As light valve 96, DMD having a diagonal size of, for example, 0.67 inches, is used.

Projection lens 98 projects video light generated by video generating unit 90 onto a screen (not shown). As a result, video is displayed on the screen. An F number of projection lens 98 is, for example, 1.7. In this exemplary embodiment, as an example of a projection optical system, projection lens 98 is used.

[1-1-2. Configuration of Lighting Unit]

As shown in FIG. 1, lighting unit 10 includes light source unit 12, and light guiding optical system 70. Light guiding optical system 70 guides emitted light from light source unit 12 to video generating unit 90.

Hereinafter, a configuration of light source unit 12 is described. Laser module 20 includes semiconductor laser elements 22 and lenses 24. Semiconductor laser elements 22 are arranged in a matrix with 5 rows and 5 columns. Each of lenses 24 is provided to each of semiconductor laser elements 22. Blue laser light having an angle of divergence and having a wavelength of 450 nm is emitted from semiconductor laser element 22. Then, the light from semiconductor laser element 22 is made to be parallel light by lens 24. Laser module 20 is an example of a light source.

The blue light emitted from laser module 20 is collected by lens 34. The light collected by lens 34 passes through lens 36 and diffusion plate 38. Lens 36 returns the light collected by lens 34 to parallel light again. Diffusion plate 38 reduces interference of the laser light, and adjusts light collection of the laser light.

Dichroic mirror 40 is a color synthesizing element whose cutoff wavelength is set to about 480 nm. That is to say, dichroic mirror 40 reflects blue light and transmits red light and green light. The blue light made to be substantially parallel light by lens 36 is reflected by dichroic mirror 40 and applied to phosphor wheel 16. In order to reduce a spot size of the laser light and to improve the use efficiency of the light, the laser light applied to phosphor wheel 16 is collected by lenses 42 and 44.

Figure 2:
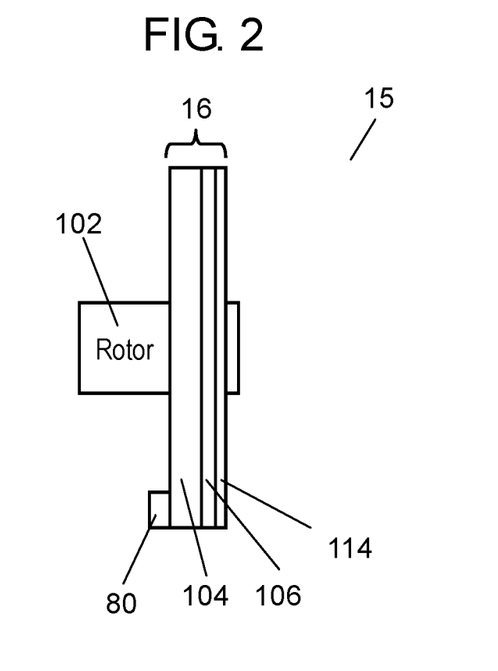
FIG. 2 is a side view of a phosphor substrate in accordance with this exemplary embodiment.
Figure 3:
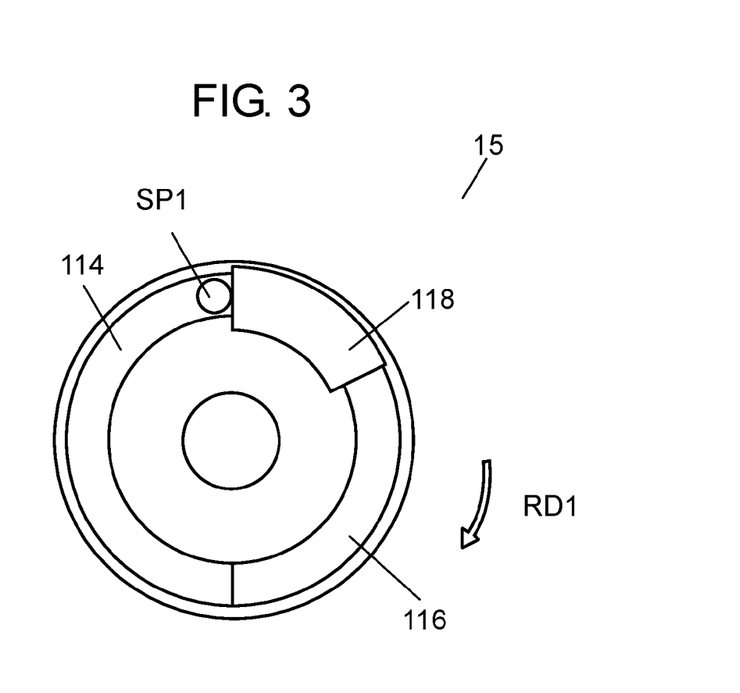
FIG. 3 is a top view of the phosphor substrate in accordance with this exemplary embodiment.

FIG. 2 is a side view of phosphor substrate 15 in accordance with this exemplary embodiment. FIG. 3 is a top view of phosphor substrate 15 in accordance with this exemplary embodiment. In other words, FIG. 3 is a view of phosphor substrate 15 seen from phosphor wheel 16 side.

Phosphor substrate (rotating substrate) 15 includes phosphor wheel 16 and rotor 102. Phosphor wheel 16 includes disk-shaped aluminum substrate 104. A surface of aluminum substrate 104 is coated with high reflection film 106. Phosphor wheel 16 is disposed such that a disk face of aluminum substrate 104 is perpendicular to an optical axis of the laser light. Aluminum substrate 104 is attached to rotor 102, and rotates along a rotating direction RD1. The rotating speed is, for example, 60 revolutions per second.

Laser light collected by lenses 42 and 44 (see FIG. 1), as circular spot light SP1, is applied to phosphor wheel 16. Phosphor wheel 16 has a plurality of regions (segments) along the rotating direction RD1 (that is to say, the circumferential direction) on a circumference to which spot light SP1 is applied. Specifically, phosphor region 114 (first region), phosphor region 116, and through region 118 are disposed to phosphor wheel 16 sequentially along the rotating direction RD1. In phosphor region 114, a phosphor emitting red light (first color light) is formed on high reflection film 106. When blue light having a wavelength of 450 nm enters phosphor region 114, red light having a main wavelength of 610 nm is generated. Phosphor region 116 has a phosphor emitting green light (second color light) on high reflection film 106. When blue light having a wavelength of about 450 nm enters phosphor region 116, green light having a main wavelength of 550 nm is generated. Through region 118 is a through hole provided to aluminum substrate 104. Blue light applied to through region 118 passes through to the opposite side as it is. That is to say, light emitted from through region 118 is blue light (third color light).

Phosphor regions 114 and 116 and through region 118 in phosphor wheel 16 correspond to a period of one frame (for example, 1/60 seconds) of video to be projected. The period of one frame is divided in terms of time into three segment periods (first segment period R1, second segment period G1, and third segment period B1), and three spoke periods S1, S2, and S3 (see FIG. 7). A period in which light is applied only to phosphor region 114 is defined as first segment period R1. A period in which light is applied only to phosphor region 116 is defined as second segment period G1. A period in which light is applied to only through region 118 is defined as third segment period B1. In spoke periods S1, S2, and S3, light is applied so as to span two segment periods, so that mixed color light of two segment periods is emitted.

Figure 7:
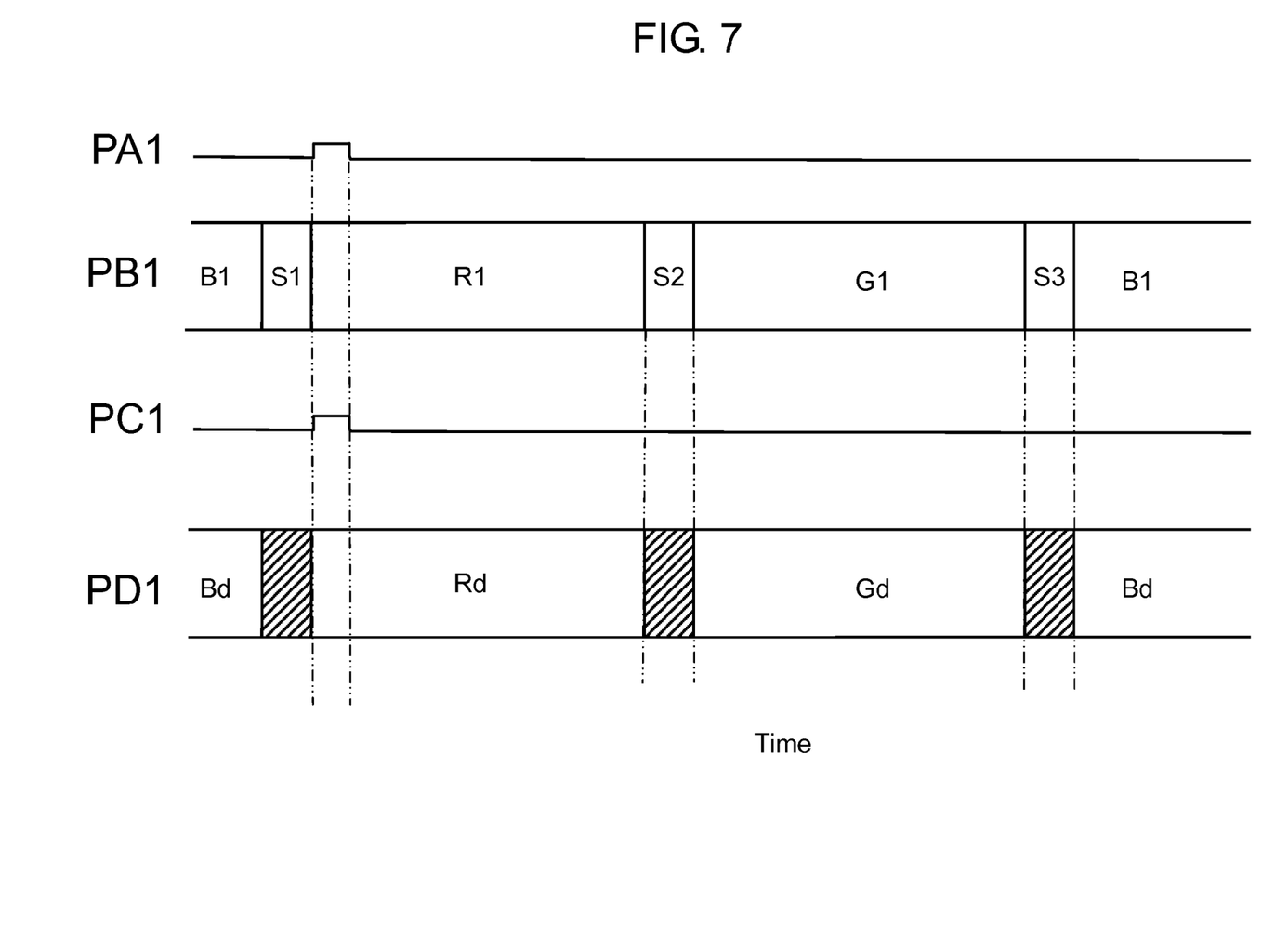
FIG. 7 is a timing chart showing a relation between a phosphor wheel and a light valve when an index mark is appropriate in accordance with this exemplary embodiment.

Spoke period S1 exists between third segment period B1 and first segment period R1. That is to say, spoke period S1 is a period in which light in mixed color of blue and red is emitted. Spoke period S2 exists between first segment period R1 and second segment period G1. That is to say, spoke period S2 is a period in which light in mixed color of red and green is emitted. Spoke period S3 exists between second segment period G1 and third segment period B1. That is to say, spoke period S3 is a period in which light in mixed color of green and red is emitted.

The light applied to phosphor wheel 16 in the first segment period is converted into red light, and reflected from phosphor wheel 16. Furthermore, the light applied to phosphor wheel 16 in the second segment period is converted into green light, and reflected from phosphor wheel 16. Such red and green phosphor light is made to be parallel light by lenses 44 and 42, returned to dichroic mirror 40, and passes through dichroic mirror 40 (see FIG. 1).

On the other hand, the light applied to phosphor wheel 16 in the third segment period passes through the through region 118. Blue light that has passed though phosphor wheel 16 is returned again to dichroic mirror 40 by mirrors 50, 52, and 58. Furthermore, blue light that has passed though phosphor wheel 16 is collected by lenses 42 and 44, but made to be parallel light by lenses 46 and 48. In addition, diffusion plate 56 for further reducing interference between lens 54 and laser light is disposed in an optical path.

Blue light that has passed though phosphor wheel 16 and returned to dichroic mirror 40 by mirrors 50, 52, and 58 is reflected by dichroic mirror 40. In this way, an optical path of the light (blue light) which has passed though phosphor wheel 16 and optical paths of the reflected light (red light and green light) are spatially synthesized by dichroic mirror 40.

As mentioned above, phosphor wheel 16 includes a plurality of regions (segments) and emits light having different wavelengths in a time-division manner.

The light synthesized by dichroic mirror 40 is collected by lens 60, and becomes emitted light from light source unit 12. The emitted light from light source unit 12 (in other words, light from phosphor wheel 16) enters light guiding optical system 70.

Next, light guiding optical system 70 is described. Light guiding optical system 70 includes rod integrator 72, lenses 74 and 76, and mirror 75. The emitted light from light source unit 12 enters rod integrator 72. Rod integrator 72 includes incident face 72a and outgoing face 72b. The illuminance of the light which has entered from light source unit 12 to incident face 72a of rod integrator 72 is made to be more uniform in rod integrator 72, and is emitted from outgoing face 72b. The light emitted from outgoing face 72b passes through lens 74, is reflected by mirror 75, then passes through lens 76, and enters video generating unit 90.

Mirror 75 reflects not less than 99% of the entering light. The light which has not been reflected by mirror 75 passes through mirror 75. Light detection unit 130 is disposed on the optical path of the light that has passed through mirror 75. Light detection unit 130 detects light that has passed through mirror 75. That is to say, light detection unit 130 detects light emitted from phosphor wheel 16. Details of light detection unit 130 are described later.

Lighting unit 10 is configured as mentioned above. The light emitted from phosphor wheel 16 enters light valve 96. Light valve 96 modulates the light emitted from phosphor wheel 16 and emits video light.

[1-1-3. Electric Configuration]

Figure 4:
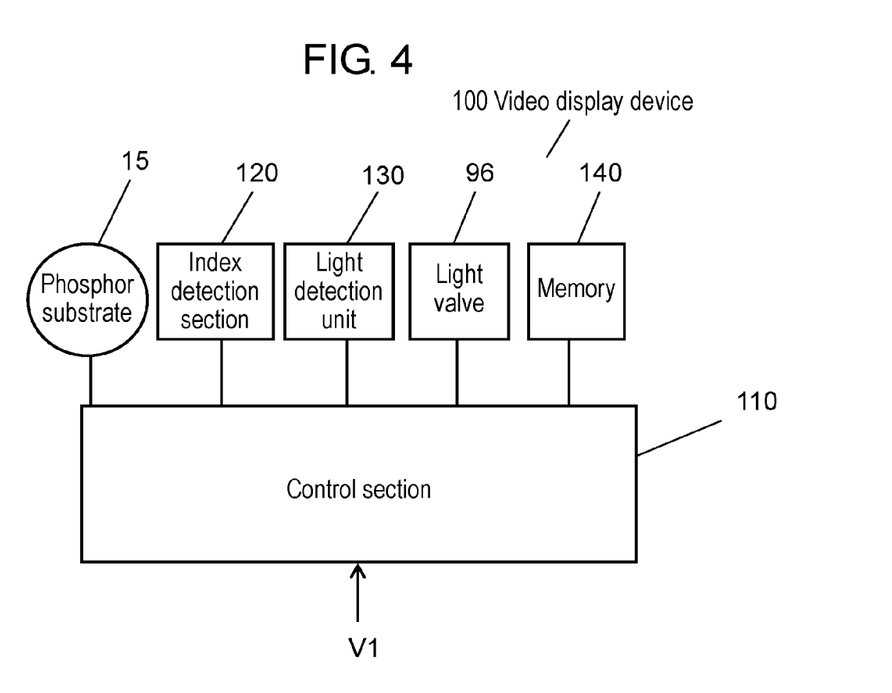
FIG. 4 is a block diagram showing an electric configuration of the video display device in accordance with this exemplary embodiment.
Figure 5:
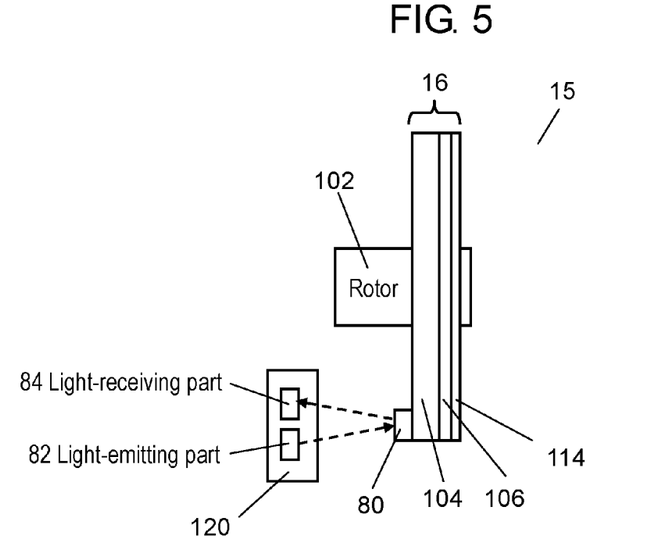
FIG. 5 is a schematic diagram showing a relation between the phosphor substrate and an index detection section in accordance with this exemplary embodiment.

FIG. 4 is a block diagram showing an electric configuration of video display device 100. FIG. 5 is a schematic diagram showing a relation between phosphor substrate 15 and index detection section 120. In video display device 100, control section 110 is connected to phosphor substrate (rotating substrate) 15, index detection section 120, light detection unit (light sensor) 130, light valve 96, and memory 140. Index detection section 120 detects a rotation position of phosphor wheel 16. Control section 110 is, for example, microcomputer. Video signal V1 to be input into control section 110 is described later.

Index detection section 120 is a photoreflector, and includes light-emitting part 82 and light-receiving part 84. Index mark 80 is placed to aluminum substrate 104 of phosphor wheel 16. Furthermore, light-emitting part 82 and light-receiving part 84 are disposed to positions confronting index mark 80. Light-emitting part 82 applies light to aluminum substrate 104, and light-receiving part 84 receives light reflected from aluminum substrate 104. On the other hand, index mark 80 hardly reflects light from light-emitting part 82. Therefore, rotation of phosphor wheel 16 reduces the intensity of the light received by light-receiving part 84 when index mark 80 passes through the position confronting light-receiving part 84. Index detection section 120 detects a change of the intensity of light, and thereby the rotation position of phosphor wheel 16 can be understood. When the intensity of light is changed, index detection section 120 sends an index signal showing that index mark 80 is detected to control section 110. For example, the index signal is in a high level when index mark 80 is detected and in a low level when it is not detected.

As mentioned above, light detection unit 130 detects light emitted from phosphor wheel 16. Specifically, light detection unit 130 sends a digital value as light information to control section 110. The digital value corresponds to each intensity of red light, green light, and blue light included in the received light.

Control section 110 controls an operation of video display device 100. Control section 110 carries out various controls by reading out and executing program which has been stored in advance in memory 140. Control section 110 synchronizes and controls the rotation of phosphor wheel 16 and the driving of light valve 96.

Control section 110 receives the index signal from index detection section 120. Furthermore, control section 110 recognizes color of the emitted light from phosphor wheel 16, that is, the light entering valve 96, based on the light information from light detection unit 130. Control section 110 understands a relation between the timing of detection of the index mark and the period in which the light in each color enters light valve 96, from the index signal and the color of the light entering light valve 96. Based on the relation, control section 110 recognizes the rotation position of phosphor wheel 16 and synchronously drives phosphor wheel 16 and light valve 96.

Figure 6:
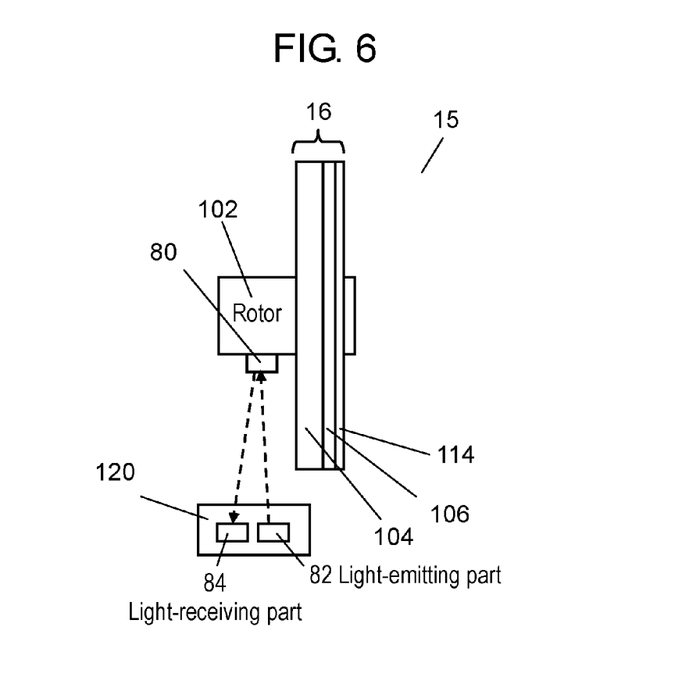
FIG. 6 is a schematic diagram showing another relation between the phosphor substrate and the index detection section in accordance with this exemplary embodiment.

Note here that in this exemplary embodiment, as show in FIG. 5, index mark 80 is placed to aluminum substrate 104. However, as shown in FIG. 6, index mark 80 may be placed to rotor 102.

1-2. Operation

An operation of video display device 100 configured as mentioned above is described below.

[1-2-1. Synchronous Driving of Phosphor Wheel and DMD]

Lighting unit 10 (see FIG. 1) outputs light of three colors, that is, red light, green light, and blue light, which are switched to each other with time. Video generating unit 90 generates video light from light of lighting unit 10. Projection lens 98 projects the generated video light on a screen (not shown). Control section 110 manages timing of driving of lighting unit 10 and video generating unit 90. That is to say, control section 110 synchronously drives light valve 96 of video generating unit 90 and phosphor wheel 16 of lighting unit 10.

Herein, synchronous driving means allowing a rotational frequency (revolutions per second) and a phase of phosphor wheel 16 to coincide with a drive frequency (Hz) and a phase of light valve 96, respectively. The drive frequency of light valve 96 means the number of times of driving to project video light for one frame per second, that is, the number of times of driving for projecting red, green, and blue video light once for each color. Allowing the phases to coincide with each other means driving light valve 96 such that light valve 96 emits video in a certain color (for example, red) when the light in the certain color (for example, red) is emitted from phosphor wheel 16 (that is, when the light in the certain color enters light valve 96).

Control section 110 controls light valve 96 so as to generate video light corresponding to light in each color based on video signal V1 input into control section 110. Specifically, control section 110 generates video signal V2 in each color corresponding to red, green and blue from video signal V1. Next, control section 110 drives light valve 96 based on video signal V2 in each color corresponding to each color of phosphor wheel 16. Note here that each period in which light valve 96 is driven based on video signal V2 in each color is referred to as a segment period (driving period) of light valve 96.

For example, control section 110 controls light valve 96 based on red video signal VR2 in a period in which red light enters light valve 96. Thus, red video light based on the red video signal VR2 is projected onto the screen. Similarly, green video light and blue video light are projected onto the screen. As mentioned above, video light in each color is projected onto the screen in a time-division manner. A user can visually recognize the video by continuously watching the video light projected onto the screen.

Next, a specific method of synchronous driving is described. Control section 110 indirectly recognizes a color of light that enters light valve 96 based on an index signal and an index value from index detection section 120.

In this exemplary embodiment, the index value is a value showing time from time at which the index signal is in a high level (that is to say, index detection section 120 detects index mark 80) to time at which red light starts to enter light valve 96. The index value is in a range, for example, from 0 to 255. The index value is stored in memory 140. Control section 110 recognizes the rotation position of phosphor wheel 16 based on the index signal with reference to the index value without referring to the light information from light detection unit 130. The rotation position of phosphor wheel 16 shows a state of the emitted light from phosphor wheel 16 and the light entering light valve 96. Control section 110 recognizes the light emitted from phosphor wheel 16 and time (in other words, the color light entering light valve 96 and time). Then, control section 110 drives, that is, synchronously drives light valve 96 depending on color light emitted from phosphor wheel 16. In other words, the index value is a value showing a phase relation between phosphor wheel 16 and light valve 96.

[1-2-2. Adjustment of Index of Phosphor Wheel]

In the way mentioned above, the control section synchronously drives phosphor wheel 16 and light valve 96. In the synchronously driving, it is important to appropriately set an index value and to accurately understand what color of video light enters light valve 96 in the present time, from the index signal and the index value.

As to a rotation position of phosphor wheel 16, index mark 80 attached to the rotation position of the wheel can be detected by index detection section 120. However, when an attachment position of index mark 80 is displaced by about several degrees, an index value becomes inappropriate. The inappropriate index value makes impossible to accurately understand the color of video light entering light valve 96 in the present time. That is to say, since the phases of phosphor wheel 16 and light valve 96 are displaced, mixture of colors occurs in the video light to be projected, thus deteriorating the quality of video.

Hereinafter, the relation among the attachment position of index mark 80, the rotation of phosphor wheel 16, and the driving of light valve 96 is described. The following FIGS. 7, 8, and 9 show cases in which the index values are the same and attachment positions of index mark 80 are different (cases where index mark 80 is appropriate and where index mark 80 is displaced).

FIG. 7 is a timing chart showing a relation between phosphor wheel 16 and light valve 96 when index mark 80 is appropriate. FIGS. 8 and 9 are timing charts each showing a relation between phosphor wheel 16 and light valve 96 when index mark 80 is displaced. In FIGS. 7, 8, and 9, the abscissa shows a passage of time in one frame period.

Figure 8:
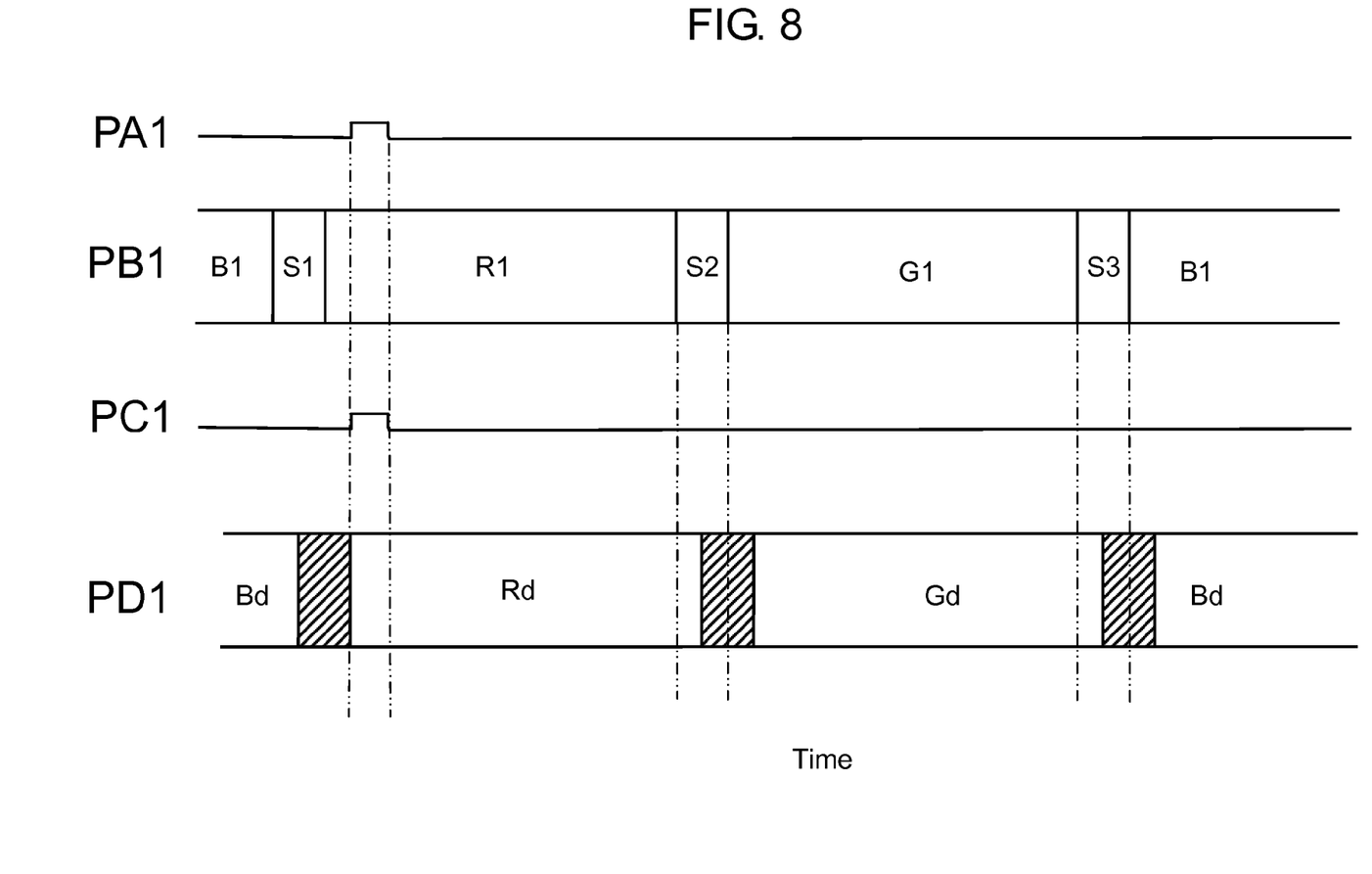
FIG. 8 is a timing chart showing a relation between the phosphor wheel and the light valve when the index mark is displaced in accordance with this exemplary embodiment.
Figure 9:
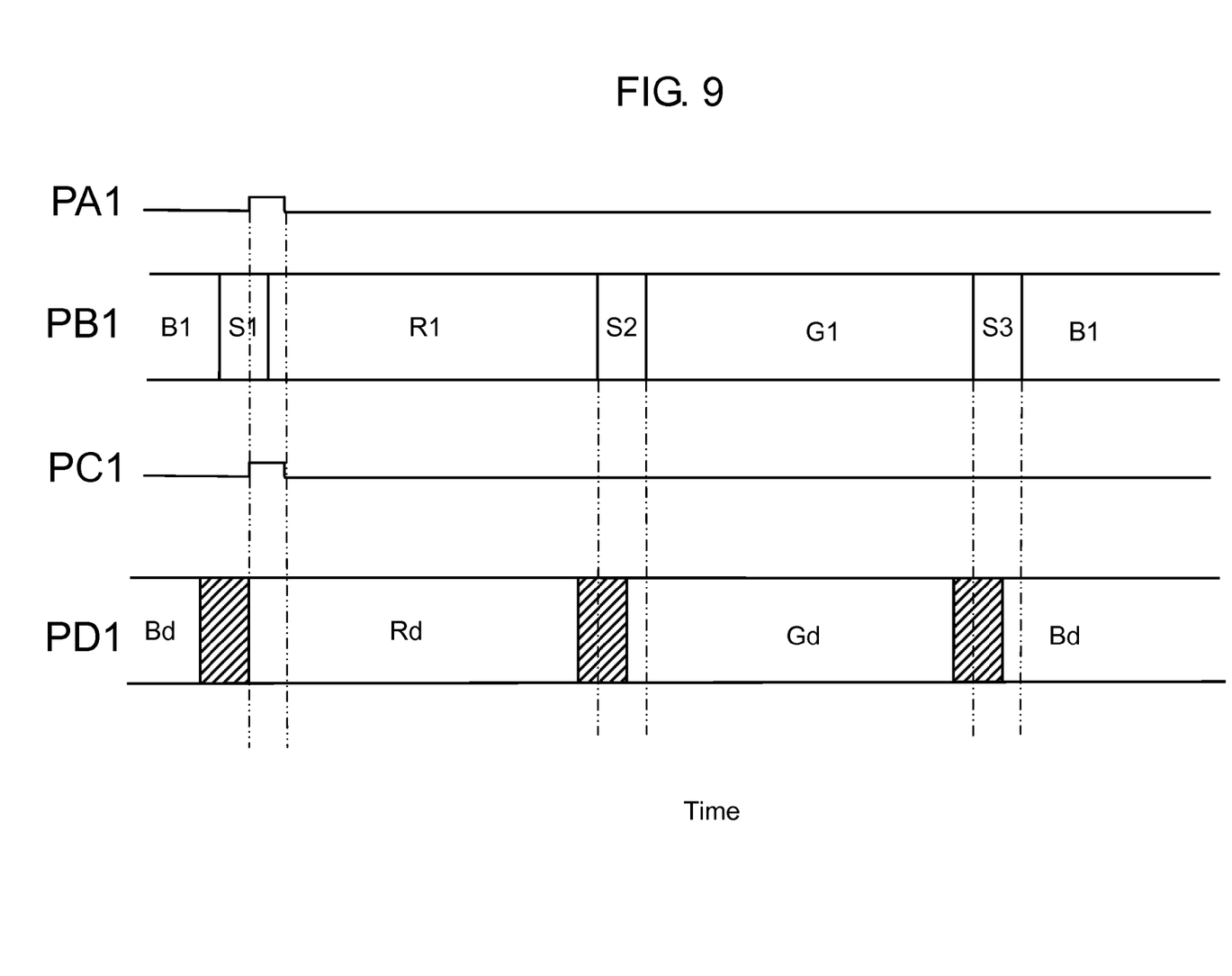
FIG. 9 is a timing chart showing a relation between the phosphor wheel and the light valve when the index mark is displaced in accordance with this exemplary embodiment.

PA1 in each of FIGS. 7, 8, and 9 shows an index signal.

PB1 in each of FIGS. 7, 8, and 9 shows first segment period R1, second segment period G1, third segment period B1, and spoke periods S1, S2, and S3 of phosphor wheel 16.

PC1 in each of FIGS. 7, 8, and 9 shows a signal to be sent to light valve 96 by control section 110 based on a signal received from index detection section 120. That is to say, PC1 in each of FIGS. 7, 8, and 9 shows a signal showing the timing at which segment period Rd starts in light valve 96. Herein, a signal for driving light valve 96 so as to display red video light is shown.

PD1 in each of FIGS. 7, 8, and 9 shows driving of light valve 96. Segment period Rd is a period in which light valve 96 is driven so as to display red video light; segment period Gd is a period in which light valve 96 is driven so as to display green video light; and segment period Bd is a period in which light valve 96 is driven so as to display blue video light.

In other words, the segment period Rd is a period in which driving corresponding to red video signal VR2 is carried out in light valve 96. The segment period Gd is a period in which driving corresponding to green video signal VG2 is carried out in light valve 96. The segment period Bd is a period in which driving corresponding to blue video signal VB2 is carried out in light valve 96. The period in a hatched portion is a period in which light valve 96 does not reflect light toward projection lens 98 (non-projection period).

For example, index mark 80 is assumed to be disposed at a position corresponding to a head portion of phosphor region 114 in which red light is generated. In a state in which index mark 80 is not displaced, as shown in FIG. 7, first segment period R1, in which light is emitted from phosphor wheel 16, coincide with segment period Rd, in which light valve 96 is driven so as to display red video light.

Next, a case where index mark 80 is displaced is described. FIG. 8 shows a case where index mark 80 is slightly displaced from the head portion of phosphor region 114 to a phosphor region 116 side in which green light is emitted. Also in this case, light valve 96 is driven based on index mark 80. Consequently, displacement occurs between first segment period R1 in which red light is emitted from phosphor wheel 16 and segment period Rd in which light valve 96 is driven so as to display red video light.

FIG. 9 shows a case where index mark 80 is slightly displaced from the head portion of phosphor region 114 to a through region 118 side in which blue light is generated. Also in this case, light valve 96 is driven based on index mark 80. Consequently, displacement may occur between first segment period R1 in which red light is emitted from phosphor wheel 16 and segment period Rd in which light valve 96 is driven so as to display red video light. Displacement between first segment period R1 and segment period Rd in which light valve 96 is driven causes displacement between second segment period G1 and segment period Gd and between third segment period B1 and segment period Bd.

In the present disclosure, even when index mark 80 is displaced, by index adjustment, the rotation of phosphor wheel 16 and the driving of light valve 96 can be synchronized with each other with high accuracy. Hereinafter, details thereof are described.

In the present disclosure, control section 110 measures phase displacement between phosphor wheel 16 and light valve 96, and appropriately sets an index value. Then, control section 110 allows starting time of the segment period in phosphor wheel 16 to coincide with corresponding starting time of the driving of light valve 96, so that the quality of video is maintained. This is referred to as index adjustment.

The index adjustment enables relative operations of phosphor wheel 16 and light valve 96 to be changed in a state in which the rotation number of phosphor wheel 16 and the driving frequency of light valve 96 correspond to each other.

Hereinafter, the index adjustment in video display device 100 in this exemplary embodiment is described.

Note here that in the present disclosure, the index value is assumed to be in a range from 0 to 255. When there is no delay between the time at which index detection section 120 detects index mark 80 and the time at which red light starts to enter light valve 96, the index value is assumed to be 127. Herein, 1 of the index value is assumed to correspond to an angle of 0.25°. Thus, the adjustment of the index value can adjust positional displacement of the index mark in the range of about ±32° (0.25×127≈32). However, the index value or the values of angle is not limited to the above-mentioned values and may be other values.

Figure 10:
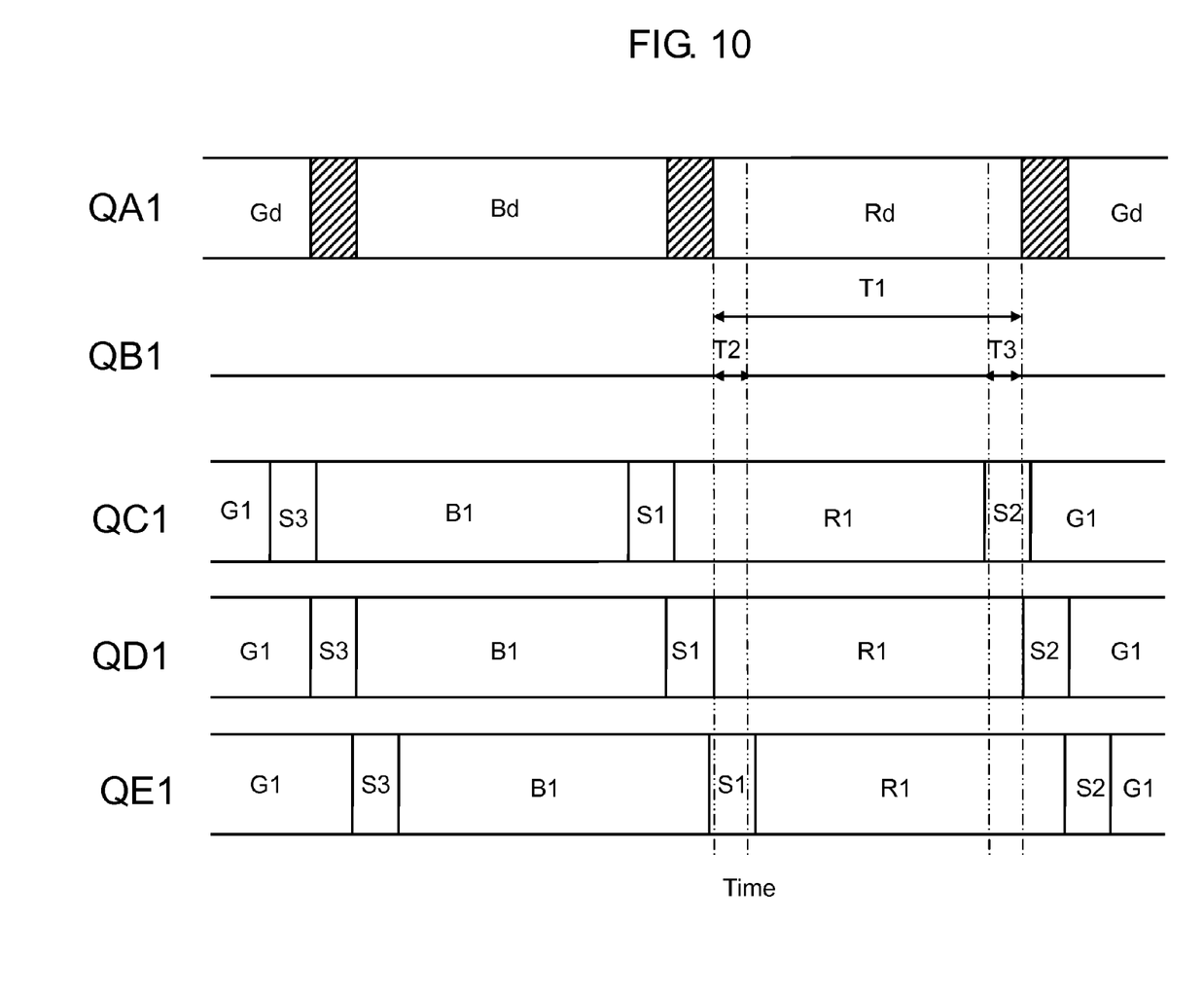
FIG. 10 is a timing chart showing an operation relation between the phosphor wheel and the light valve in accordance with this exemplary embodiment.

Firstly, light is allowed to enter phosphor wheel 16 so as to drive phosphor wheel 16 and light valve 96. FIG. 10 is a timing chart showing an operation relation between phosphor wheel 16 and light valve 96 when the index value is changed. In FIG. 10, the abscissa shows a passage of time in one frame period.

QA1 in FIG. 10 shows an operation of light valve 96. Segment period Rd is a period in which driving corresponding to red video signal VR2 is carried out in light valve 96. Segment period Gd is a period in which driving corresponding to green video signal VG2 is carried out in light valve 96. Segment period Bd is a period in which driving corresponding to blue video signal VB2 is carried out in light valve 96. The period shown by hatching is a period in which light valve 96 does not reflect light toward projection lens 98 (non-projection period).

QB1 in FIG. 10 shows detection periods of light information in light detection unit 130. The detection periods are predetermined periods corresponding to head and rear portions of a certain segment period (driving period) in light valve 96. In this exemplary embodiment, a segment period corresponding to red color (that is to say, a period in which light valve 96 is driven in response to red video signal VR2) is defined as a certain segment period (first period T1). Furthermore, a predetermined period of the head portion included in first period T1 is defined as detection period (second period) T2. In addition, a predetermined period of the rear portion which is not included in the first period and does not overlap with detection period T2 is defined as detection period (third period) T3. In other words, in the red segment period (first period T1), a predetermined period from the head portion is defined as detection period T2. In the red segment period, a period from one position to a rearmost portion is defined as detection period T3. The detection periods T2 and T3 are included in the red segment period. Herein, it is preferable that detection periods T2 and T3 have the same length. Furthermore, it is preferable that the length between detection period T2 and detection period T3 is as long as possible.

The length of segment period Rd of light valve 96 is equal to the length of the first segment period in which red light is emitted from the phosphor wheel (the same is true to the other colors). That is to say, a predetermined period of the head portion included in first period T1 having the same length as that of the first segment period in which light enters only phosphor region 114 can be referred to as detection period T2, and a predetermined period of the rear portion which is not included in the first period and does not overlap with detection period T2 can be referred to as detection period T3.

In a detection period of light information, instead of carrying out detection over the entire period of a certain segment period, the detection period is made to be shorter and the detection period is made to be only the head and rear portions of the segment period as shown in QB1 in FIG. 10, thereby improving the detection accuracy. Furthermore, detection time by detecting control section 110 becomes shorter, so that a load on detection processing can be reduced.

Next, specific processing procedure for the index adjustment is described. Firstly, control section 110 drives lighting unit 10 to emit light in each color by using an arbitrary index value (for example, a firstly set index value). Note here that control section 110 controls lighting unit 10, thereby carrying out the index adjustment. At this time, the presence or absence of video signal V1 and driving of light valve 96 are arbitrary. Next, control section 110 allows light detection unit 130 to detect the light emitted from phosphor wheel 16. Light detection unit 130 generates a digital value corresponding to the intensity of each component of red, green, and blue components from the detected light, and sends the digital value as light information to control section 110.

Control section 110 calculates an evaluation value SR for detecting purity of light by using the light information. In the components included in the light information in detection period T2, a red-color component is defined as measurement value SR1, a green-color component is defined as measurement value SG1, and a blue-color component is defined as measurement value SB1. Furthermore, in the components included in the light information in detection period T3, a red-color component is defined as measurement value SR2, a green-color component is defined as measurement value SG2, and a blue-color component is defined as measurement value SB2. The evaluation value SR is expressed by the following Mathematical Formula 1 (Math. 1) using the above-mentioned measurement values.

$$SR = -SR1 - SG1 - SB1 + SR2 - SG2 - SB2 \qquad \text{[Math. 1]}$$

Control section 110 drives lighting unit 10 while changing the index values and calculates the evaluation value SR. Thereby, control section 110 obtains information showing the relation between the index value and the evaluation value SR.

Figure 11:
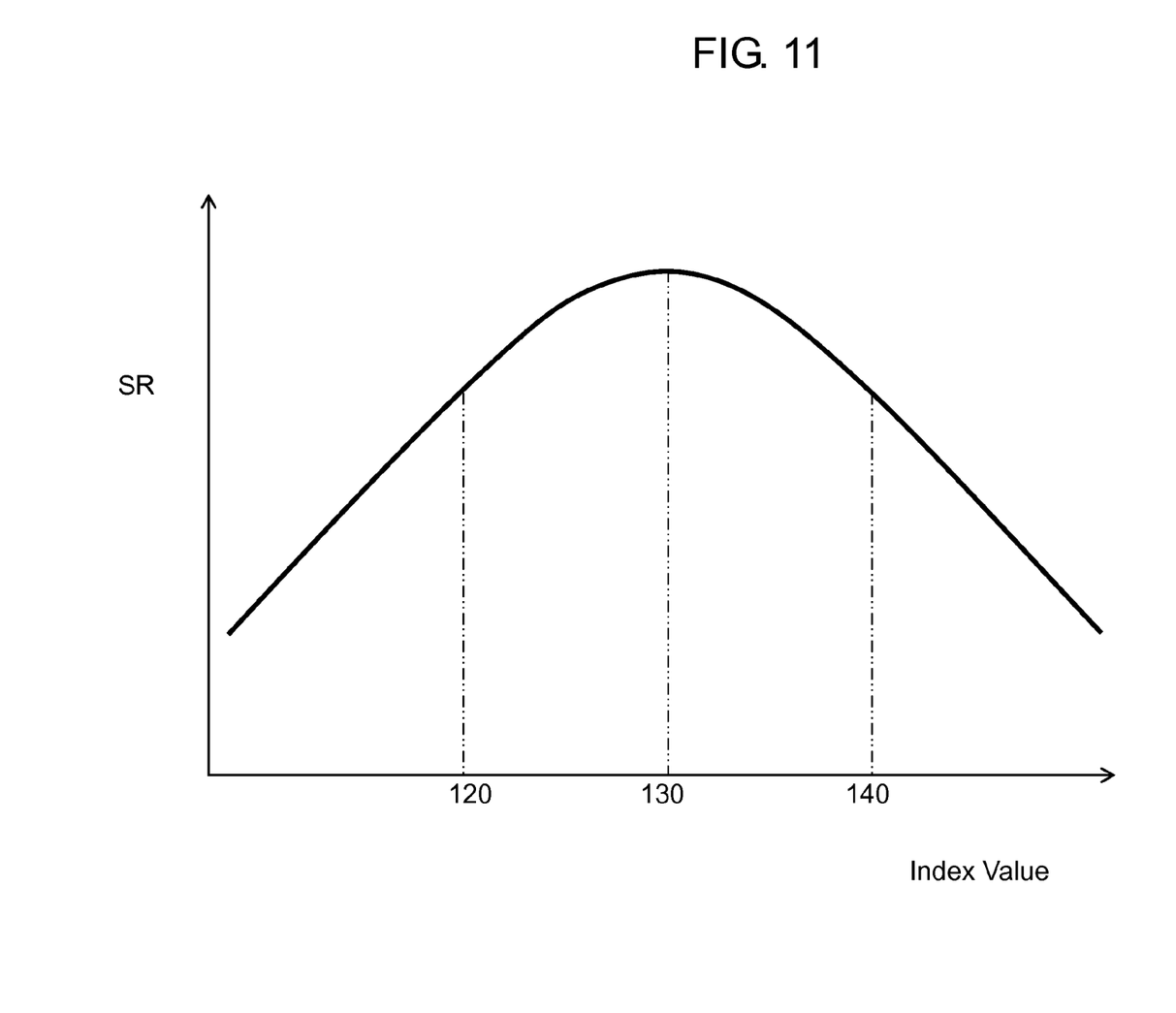
FIG. 11 is a graph showing a relation between an index value and an evaluation value in accordance with this exemplary embodiment.

FIG. 11 is a graph showing a relation between the index value and the evaluation value SR. The abscissa of the graph shows the index value and the ordinate shows the evaluation value SR. In detection periods T2 and T3, the more the red-color components are detected, the more the evaluation value SR expressed by Formula 1 is increased. On the other hand, light having wavelengths of color components such as green and blue, other than red, is mixed, the evaluation value SR is reduced. Therefore, the graph shows that the SR value when the index value is changed has a peak value at which purity of red becomes maximum. FIG. 11 shows a case where the evaluation value SR becomes maximum at the time when the index value is 130. Control section 110 stores an index value, at the time when the maximum value of the evaluation value SR is obtained (130 in this example), as a new index value, in memory 140.

QC1 in FIG. 10 shows a phase relation of phosphor wheel 16 with respect to light valve 96 when the index value is set to "120." QD1 in FIG. 10 shows a phase relation of phosphor wheel 16 with respect to light valve 96 when the index value is set to "130." QE1 in FIG. 10 shows a phase relation of phosphor wheel 16 with respect to light valve 96 when the index value is set to "140."

First segment period R1 is a period in which the light information detected by light detection unit 130 shows red light. That is to say, first segment period R1 is a period in which red light is emitted from phosphor wheel 16. Second segment period G1 is a period in which the light information detected by light detection unit 130 shows green light. That is to say, second segment period G1 is a period in which green light is emitted from phosphor wheel 16. Third segment period B1 is a period in which the light information detected by light detection unit 130 shows blue light. That is to say, third segment period B1 is a period in which blue light is emitted from phosphor wheel 16. Spoke periods S1, S2, and S3 in which colors of light are gradually changed are included in each portion between the segment periods.

In the case where the index values are 120, 130 and 140, control timing of light valve 96 and states of light emitted from phosphor wheel 16 are shown in QC1, QD1, and QE1 in FIG. 10, respectively. Herein, the index value when the evaluation value SR becomes maximum is an optimum index value. In this exemplary embodiment, as shown in QD1 in FIG. 10, when the index value is 130, the emission of the light from the phosphor wheel and the driving of light valve 96 are synchronized with each other. Control section 110 determines that phosphor wheel 16 and light valve 96 are synchronized with each other when the index value is 130. In this way, video display device 100 is adjusted.

Hereinafter, by using the index values adjusted as mentioned above, phosphor wheel 16 and light valve 96 are driven as shown in QD1 and QA1 in FIG. 10. In this way, according to this exemplary embodiment, phosphor wheel 16 and light valve 96 are synchronized and driven with high accuracy.

That is to say, in the present disclosure, firstly, phosphor wheel 16 and light valve 96 are driven to carry out index adjustment, and the index value in which the evaluation value SR is maximum is stored in memory 140. Next, in the driving of control section 110, when control section 110 is driven based on the index value, even when the position of index mark 80 is displaced, phosphor wheel 16 and light valve 96 are synchronized with each other with high accuracy.

1-3. Advantageous Effects Etc.

As mentioned above, in this exemplary embodiment, video display device 100 includes laser module 20, phosphor wheel 16, light valve 96, light detection unit 130, and control section 110.

Phosphor wheel 16 includes a plurality of segments including phosphor region 114 in the rotating direction RD1 of aluminum substrate 104 provided rotatably. At least one of the plurality of segments of phosphor wheel 16 converts light, which enters from laser module 20, into light in a different color, and emits the light.

Light valve 96 modulates the light emitted from phosphor wheel 16 and emits video light.

Light detection unit 130 detects the light emitted from phosphor wheel 16.

Control section 110 synchronizes the driving timing of phosphor wheel 16 and light valve 96 with each other based on the detection result in light detection unit 130 in each of detection period T2, which included in first period T1 having the same length as that of the first segment period during which light from the light source is allowed to enter only phosphor region 114, and detection period T3, which is included in first period T1 and does not overlap with detection period T2.

With such a configuration, video display device 100 in accordance with this exemplary embodiment can synchronize the rotation of phosphor wheel 16 and the driving of light valve 96 with each other with high accuracy. That is to say, even when spoke periods S1, S2, and S3, in which light mixed color is emitted, are included, the rotation of phosphor wheel 16 and the driving of light valve 96 can be synchronized with each other with high accuracy.

Other Exemplary Embodiments

As mentioned above, as an example of the technology disclosed in the present application, the exemplary embodiment is described. However, the technology in the present disclosure is not necessarily limited to this, and exemplary embodiments including change, replacement, addition, and omission may be applied to the present disclosure. Furthermore, a new exemplary embodiment including combination of the components described in the above-mentioned exemplary embodiment can be employed.

The following is an example of other exemplary embodiments.

In the above-mentioned exemplary embodiment, phosphor region 114 is described as an example of a first segment. However, the first segment may be phosphor region 116 and through region 118. That is to say, the purity of blue or green may be used as an evaluation value SR.

In the description of the above-mentioned exemplary embodiment, second period (detection period) T2 is a predetermined period in the head portion included in the red segment period, and third period (detection period) T3 is a predetermined period in the rear portion which does not overlap with detection period T2. In other words, a predetermined period in the start of the segment period and a predetermined period in the end of the segment period are defined as detection periods. However, second period T2 only needs to be a period included in first period T1 having the same length as that of the period during which light from light source enters only the first segment. Furthermore, third period T3 only needs to be a period which is included in first period T1 and does not overlap with second period T2. In other words, it is only required that second period T2 and third period T3 are set at a predetermined interval without overlapping with each other, third period T3 is set after second period T2, and the length from the head portion of second period T2 to the rear portion of the third period T3 is not longer than the length of first period T1. Therefore, second period T2 may be set after the start of the segment period at a predetermined interval, and third period T3 may be set at a predetermined interval from the end of the segment period.

In the description of the above-mentioned exemplary embodiment, the length of second period T2 is the same as that of the third period T3. However, the length of second period T2 is not necessarily the same as that of the third period T3. When the length of second period T2 is different from that of third period T3, the evaluation value SR is calculated while weighting is carried out with the length of the period considered.

In the above-mentioned exemplary embodiment, the index value is a value showing the period from time when an index signal is in a high level (when index mark 80 is detected) to time when red light starts to enter light valve 96. However, the index value may be information showing a relation between the detection period of the index signal and a rotation position of phosphor wheel 16 (or timing at which light in each color enters light valve 96). Therefore, the index value may be a period from time when the index signal is in a high level to time when green light or blue light starts to enter.

In the above-mentioned exemplary embodiment, phosphor wheel 16 is described as an example of the wheel. However, a wheel only needs to have a configuration in which the wheel includes a plurality of segments including a first segment in the rotating direction RD1 of a substrate provided rotatably, and at least one of the plurality of segments converts light, which enters from the light source, into light in a different color, and emits the light. Therefore, the wheel may be a color wheel, a trimming wheel, or the like, provided with a segment for emitting light having a different color from that of the entering light by cutting a part of the wavelength of the entering light.

In the above-mentioned exemplary embodiment, semiconductor laser element 22 is used as a light source. However, the light source is not particularly limited to this, and examples thereof include a metal halide lamp, an extra-high pressure mercury lamp, a halogen lamp, or the like.

In the above-mentioned exemplary embodiment, DMD is used as an example of light valve 96. However, the light valve may be an element for modulating light emitted from lighting unit 10 and outputting video light. Example of the light valve include a reflection type liquid crystal panel, a transmission type liquid crystal panel, or the like.

In the above-mentioned exemplary embodiment, laser module 20 including semiconductor laser elements 22 arranged in a matrix with 5 rows and 5 columns is described as an example, but the number and arrangement of semiconductor laser elements 22 are not particularly limited to this example. The number and arrangement may be appropriately set depending on the intensity of light per semiconductor laser element 22, desired output suitable for light source unit 12, and the like. Furthermore, the wavelength of the laser light is not limited to 450 nm, and, for example, a violet-color semiconductor laser element for outputting light having a wavelength of 405 nm, a semiconductor laser element for outputting ultraviolet rays having a wavelength of not higher than 400 nm, or the like, may be used.

The above-mentioned exemplary embodiment describes a configuration in which a phosphor is excited by blue laser light to emit light having main wavelengths of red and green. However, a phosphor for emitting light having main wavelengths of yellow, yellow-green, and blue-green, or the like, may be used.

An optimum value of a spot diameter of laser light on the phosphor is somewhat changed depending upon a size of a light modulation element, an F number of an optical system, a type of phosphors, and intensity of laser light entering the phosphor. Therefore, depending upon specifications of a video display device, based on the optimization techniques of parameters shown in the abovementioned exemplary embodiment, optimum values may be set appropriately.

As mentioned above, video display device 100 includes a light source (semiconductor laser element 22), a rotating substrate (phosphor substrate 15), light detection unit 130, light valve 96, and control section 110. The rotating substrate (phosphor substrate 15) has a wheel (phosphor wheel 16) having a first region which allows receiving light from the light source (semiconductor laser element 22) and emitting the light as first color light. Light detection unit 130 detects the intensity of first color light emitted from the wheel (phosphor wheel 16) in second period T2 included in first period T1 and in a third period which is included in first period T1 and does not overlap with second period T2, where first period T1 is a period equal to time during which the light continuously enters the first region. Light valve 96 modulates the first color light emitted from the wheel (phosphor wheel 16) and emits the light for video. Control section 110 is connected to the rotating substrate (phosphor substrate 15), light detection unit 130, and light valve 96, and controls at least one of the wheel (phosphor wheel 16) and light valve 96 based on the intensity of the first color light detected in light detection unit 130.

The present technology can be applied to a lighting unit using a phosphor and a video display device including the lighting unit. Specifically, the present technology can be applied to television, or the like, in addition to a projector.

What is claimed is:

1. A video display device comprising:
   a light source;
   a rotating substrate including a wheel having a first region which allows receiving light from the light source and emitting the light as first color light;
   a light detection unit for detecting intensity of the first color light emitted from the wheel in a second period included in a first period and in a third period which is included in the first period and does not overlap with the second period, where the first period is a period equal to time during which the light continuously enters the first region;
   a light valve for modulating the first color light emitted from the wheel and emitting light for video; and
   a control section connected to the rotating substrate, the light detection unit, and the light valve, and controlling at least one of the wheel and the light valve based on the intensity of the first color light detected in the light detection unit.

2. The video display device of claim 1, wherein the control section calculates purity of the first color light from the intensity of the first color light detected in the light detection unit, and controls at least one of the wheel and the light valve such that the purity becomes maximum.

3. The video display device of claim 2, further comprising an index detection section connected to the control section, applying light to the rotating substrate, detecting the light emitted from the rotating substrate, and sending an index signal to the control section,
   wherein the control section controls at least one of the wheel and the light valve based on the index signal and the intensity of the first color light.

4. The video display device of claim 3, wherein in a case where a value showing time from time at which the index detection section sends the index signal to time at which the light enters the light valve is defined as an index value, the control section obtains a maximum value of the purity of the first color light from the intensity of the first color light when the index value is changed.

5. The video display device of claim 1, wherein the wheel further includes a second region which allows receiving the light from the light source and emitting the light as second color light, and a third region which allows receiving the light from the light source and emitting the light as third color light.

6. The video display device of claim 5, wherein the control section controls at least one of the wheel and the light valve such that an evaluation value becomes maximum, the evaluation value being a sum of a value obtained by subtracting intensity of the second color light and intensity of the third color light from the intensity of the first color light in the second period, and a value obtained by subtracting the intensity of the second color light and the intensity of the third color light from the intensity of the first color light in the third period.

7. The video display device of claim 1, wherein a phosphor is formed in the first region.

8. The video display device of claim 1, wherein a length of the second period is equal to a length of the third period.

9. A method for adjusting a video display device, the method comprising:
   applying light from a light source;
   allowing the light to enter a wheel having a first region in a rotating substrate, and then emitting the light as first color light;
   applying the color light emitted from the wheel to a light valve;
   detecting intensity of the first color light emitted from the wheel in a second period included in a first period and in a third period which is included in the first period and does not overlap with the second period, where the first period is a period equal to time during which the light continuously enters the first region; and controlling at least one of the wheel and the light valve on a basis of the intensity of the detected first color light.

10. The method for adjusting a video display device of claim 9, wherein purity of the first color light is calculated from the intensity of the detected first color light, and at least one of the wheel and the light valve is controlled such that the purity becomes maximum.

11. The method for adjusting a video display device of claim 10, the method further comprising:

applying light to the rotating substrate, detecting the light emitted from the rotating substrate, and generating an index signal, wherein at least one of the wheel and the light valve is controlled based on the index signal and the intensity of the first color light.

12. The method for adjusting a video display device of claim 11, wherein in a case where a value showing time from time at which the index signal is generated to time at which the light enters the light valve is defined as an index value, a maximum value of the purity of the first color light is obtained from the intensity of the first color light when the index value is changed.

13. The method for adjusting a video display device of claim 9, wherein the wheel further includes a second region which allows receiving the light from the light source and emitting the light as second color light, and a third region which allows receiving the light from the light source and emitting the light as third color light.

14. The method for adjusting a video display device of claim 13, wherein at least one of the wheel and the light valve is controlled such that an evaluation value becomes maximum, the evaluation value being a sum of a value obtained by subtracting intensity of the second color light and intensity of the third color light from the intensity of the first color light in the second period, and a value obtained by subtracting the intensity of the second color light and the intensity of the third color light from the intensity of the first color light in the third period.

15. The method for adjusting a video display device of claim 9, wherein a phosphor is formed in the first region.

16. The method for adjusting a video display device of claim 9, wherein a length of the second period is equal to a length of the third period.

\* \* \* \* \*